United States Patent
Drexler et al.

[11] Patent Number: 6,002,579
[45] Date of Patent: Dec. 14, 1999

[54] SWITCHGEAR UNIT

[75] Inventors: Johann Drexler, Schwandorf; Manfred Schmidt, Ursensollen, both of Germany

[73] Assignee: Siemens Aktiengesellschaft, München, Germany

[21] Appl. No.: 09/077,846

[22] PCT Filed: Dec. 9, 1996

[86] PCT No.: PCT/DE96/02357

§ 371 Date: Jun. 16, 1998

§ 102(e) Date: Jun. 16, 1998

[87] PCT Pub. No.: WO97/23889

PCT Pub. Date: Jul. 3, 1997

[30] Foreign Application Priority Data

Dec. 22, 1995 [DE] Germany .......................... 195 48 480

[51] Int. Cl.⁶ .................................................. H02B 5/00
[52] U.S. Cl. .................. 361/605; 361/614; 361/615; 361/634; 361/635; 200/50.33; 200/50.35; 335/159; 335/160; 335/161
[58] Field of Search .................. 361/605, 609, 361/610, 615, 634, 636; 200/50.33, 50.35; 335/159, 160, 161

[56] References Cited

U.S. PATENT DOCUMENTS 3,815,063 6/1974 Grunert et al. .......................... 335/160
3,824,510 7/1974 Kolb et al. .
4,356,363 10/1982 Harbauer et al. ..................... 200/50.33
4,544,814 10/1985 Butterworth et al. .
4,883,927 11/1989 Apfelbacher et al. ............... 200/50.33

FOREIGN PATENT DOCUMENTS

| 11 47 299 | 4/1963 | Germany . |
| 24 32 531 | 2/1975 | Germany . |
| 35 28 948 | 2/1987 | Germany . |
| 41 42 179 | 6/1993 | Germany . |
| 24 40 361 | 1/1997 | Germany . |

*Primary Examiner*—Leo P. Picard
*Assistant Examiner*—Boris L. Chervinsky
*Attorney, Agent, or Firm*—Kenyon & Kenyon

[57] ABSTRACT

A switchgear unit comprising two switching devices (1, 2) which are provided with a reversing combination, which switchgear unit is of simple design and allows easy assembly and disassembly by the customer. The reversing combination comprises an assembly which is composed of a support (3) and an anchor (4) and is inserted into slots (7, 8) in connecting side walls (5, 6) of the switching devices (1, 2). The anchor (4) prevents the contact carriers (10) of the switching devices (1, 2) from being released at the same time and, when one of the switching devices (1 or 2) is switched on, prevents the contact carrier (10) of the other switching device (2 or 1) from being released.

8 Claims, 4 Drawing Sheets

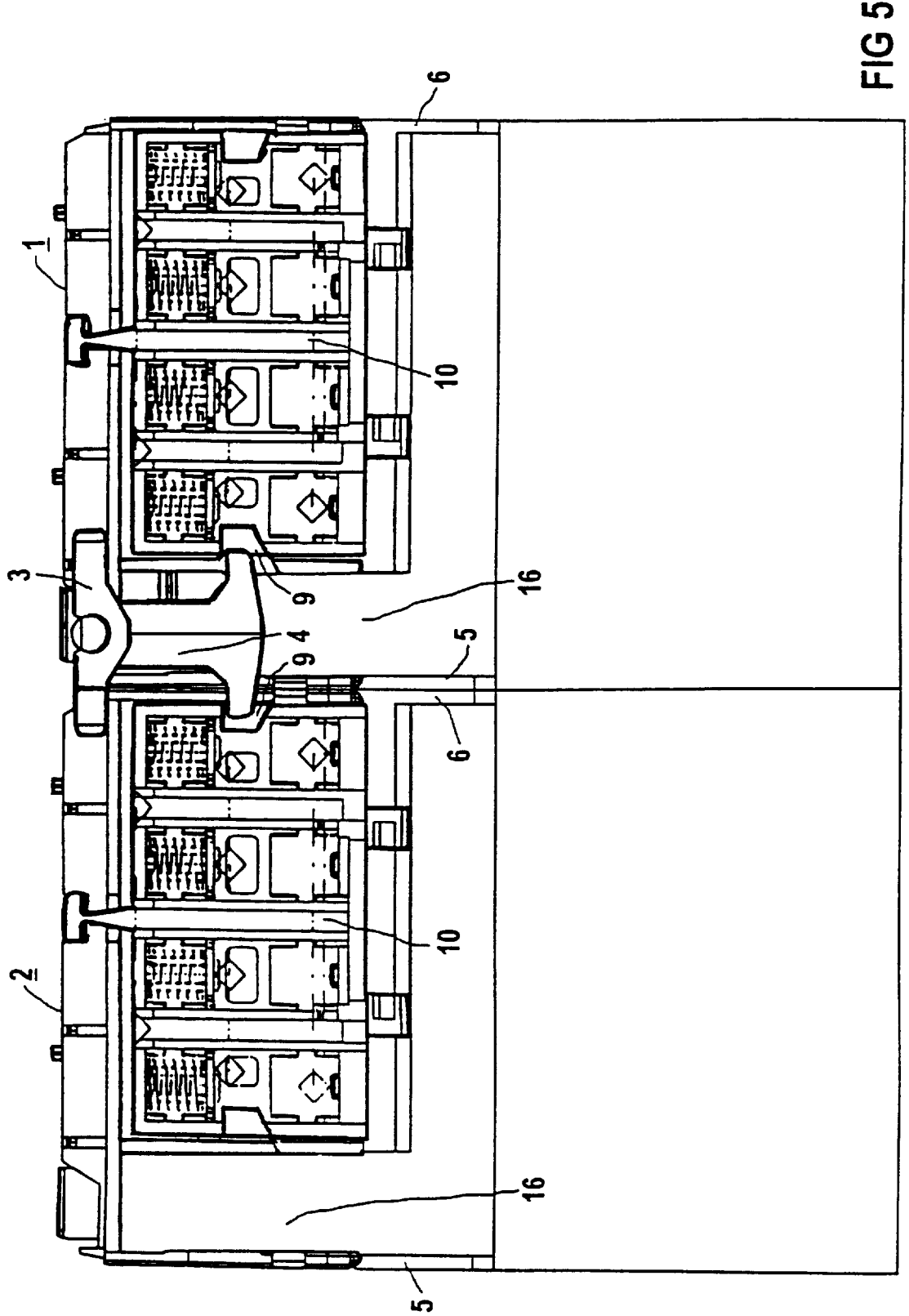

SWITCHGEAR UNIT

FIELD OF THE INVENTION

The present invention relates to a switchgear unit comprising a first switching device and a second switching device which are jointly provided with a reversing combination.

RELATED TECHNOLOGY

DE 11 47 299 discloses a mechanical interlocking apparatus for a reversing contactor for three-phase motors, which reversing contactor is composed of two electromagnets which are arranged side-by-side and have associated armatures which can move in a straight line for contact operation. As an interlocking apparatus, one or more pendulums are in this case arranged between the two electromagnets and its or their free end or ends is or are provided with in each case two projections which, in the rest state, project slightly into the movement path of both armatures and, when one of the electromagnets is energized, on the one hand is or are forced by the armature of said pulled-in electromagnet out of the movement path of said armature and, on the other hand, is or are pivoted—in a completely blocking manner—into the movement path of the other armature.

DE 24 40 361 B2 discloses a mechanical interlock by means of which parts which move parallel, for example the switching heads of two contactors, can be mutually interlocked. The mechanical interlock has a T-shaped interlocking piece with two opposite support pins which are held by elongated hole guide supports, which are each located in the moving parts to be interlocked. The housing of the mechanical interlock projects into corresponding recesses in the housings, for example switch housings, which contain the moving parts. The interlocking housing is arranged in the gap between the housings with the parts to be mutually interlocked.

DE-AS 11 47 299 describes a mechanical interlocking apparatus for two electromagnets of a reversing contactor which are arranged side-by-side. In this case, two pendulums mounted between moving contact carriers, such that they can rotate. The free ends of the pendulums are broadened by projections which allow straight-line movement of in each case only a single contact carrier, while the other one is held in the rest position by the projection, which is forced into its movement path.

DE 41 42 179 A1 discloses a mechanical interlocking device. Once again, a plurality of contactors which are mounted side-by-side are intended to be operated in such a manner that, when one contactor has been switched on, it is impossible to switch the other contactor. To this end, two locking catches are mounted in the mutually facing side surfaces, which rest against one another, of the contactors, of which locking catches, the one locking catch can be pivoted out of its original position by the drive element of the one contactor, and the other locking catch can be pivoted out of its original position by the drive element of the other contactor, in such a manner that the first of the two locking catches to become soiled blocks the other locking catch until the first locking catch has returned to its original position.

SUMMARY OF THE INVENTION

An object of the present invention is therefore to provide a switchgear unit which is of simple design and accordingly allows simple assembly and disassembly. A further aim of the present invention is to avoid any risk of soiling, for example through openings on the front of the switching devices. It is intended that the reversing combination should be fitted with as little change as possible to the device design.

The main object according to the invention is achieved by a switchgear unit as claimed in the features The present invention therefore provides a switchgear unit having a first and a second switching device and a reversing combination. The reversing combination in this case comprises a support and an anchor which is mounted in this support such that it can pivot. A first connecting side wall of the first switching device is connected to a second connecting side wall of the second switching device. The connecting side walls have opposite first slots, into which the support is inserted. In this case, the two switching devices are operated at the same time, the anchor engages in the contact carriers of both switching devices and prevents both switching devices from being switched on, while, when one of the two switching devices is operated, the anchor is pressed into the contact carrier of the other switching device and interlocks it.

An advantageous development of the present invention results if the two switching devices are connected by connecting elements which engage like brackets around the ribs on the switching devices.

Advantageously, the connecting elements have two outer limbs for engaging around the connecting side walls, as well as a center pin which engages in a positively locking manner in a recess which is formed by the connecting side walls.

It is furthermore advantageous if the support is designed to be shape-coded and the first slots are matched to the shape coding in order to accommodate the support. This ensures that the assembly comprising the support and the anchor is fitted in the correct orientation. This is necessary in order that, when the mechanical reversing combination is being fitted, the connecting side walls (which match one another for this purpose) of the two switching devices are connected. The position of the contact carriers in the two switching devices is ensured only to the extent that the armature actually engages in the free space of one contact carrier or the other of the two switching devices, depending on the pivoted position.

BRIEF DESCRIPTION OF THE DRAWINGS

An exemplary embodiment of the present invention is explained in more detail in the following text with reference to the drawings, in which:

FIG. 5 shows the positioning of a support and anchor of two switching devices which are connected to one another.

DETAILED DESCRIPTION

Figure 1:
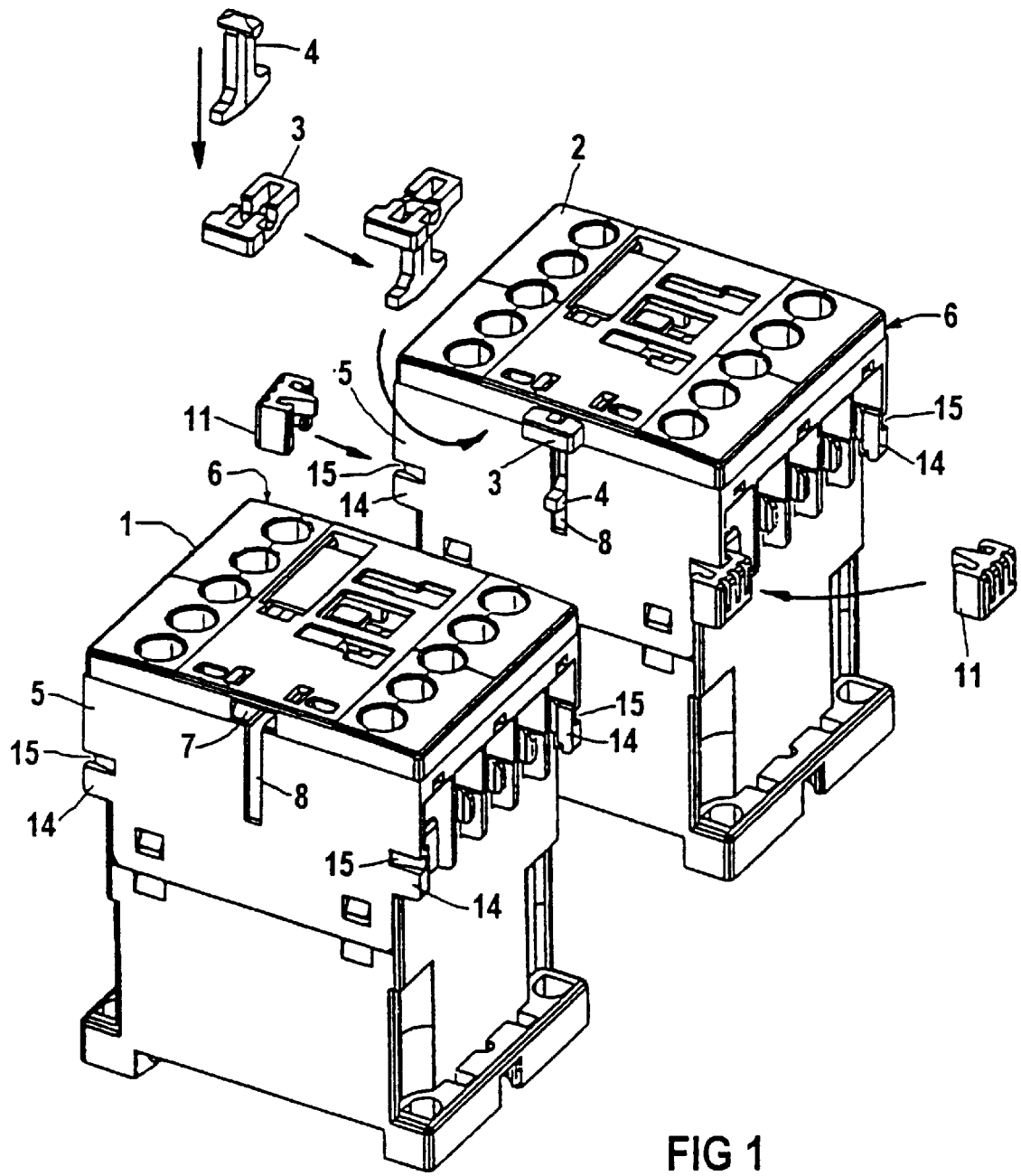
FIG. 1 shows two switching devices which are to be connected to a reversing combination.

FIG. 1 shows a first switching device 1 and a second switching device 2, for example contactors, which can be connected to one another to form a switchgear unit having a reversing combination 3, 4. The two switching devices 1 and 2, which each have a contact carrier which is not illustrated here but has moving contacts, are connected a first connecting side wall 5 and a second connecting side wall 6 of the two switching devices 1 and 2. The reversing combination has a support 3 and an anchor 4 which is mounted in this support 3 such that it can pivot. The support 3 is inserted into opposite first slots 7 in the first side wall 5 and the second side wall 6. Second slots 8 are provided in the first connecting side wall 5 and in the second connecting side wall 6 in the pivoting range of the armature 4, via which second slots 8 the anchor 4 can engage in cutouts 9 in the contact carriers 10, as will be explained in more detail below.

The mounting of the support 3 and anchor 4 in side first slots 7 and second slots 8 results in the advantage that, irrespective of whether they are used in conjunction with a reversing combination, the switching devices 1 and 2 can operate without any opening at the front, and the device design can remain unchanged. In addition, risk of soiling in this embodiment is low.

Figure 2:
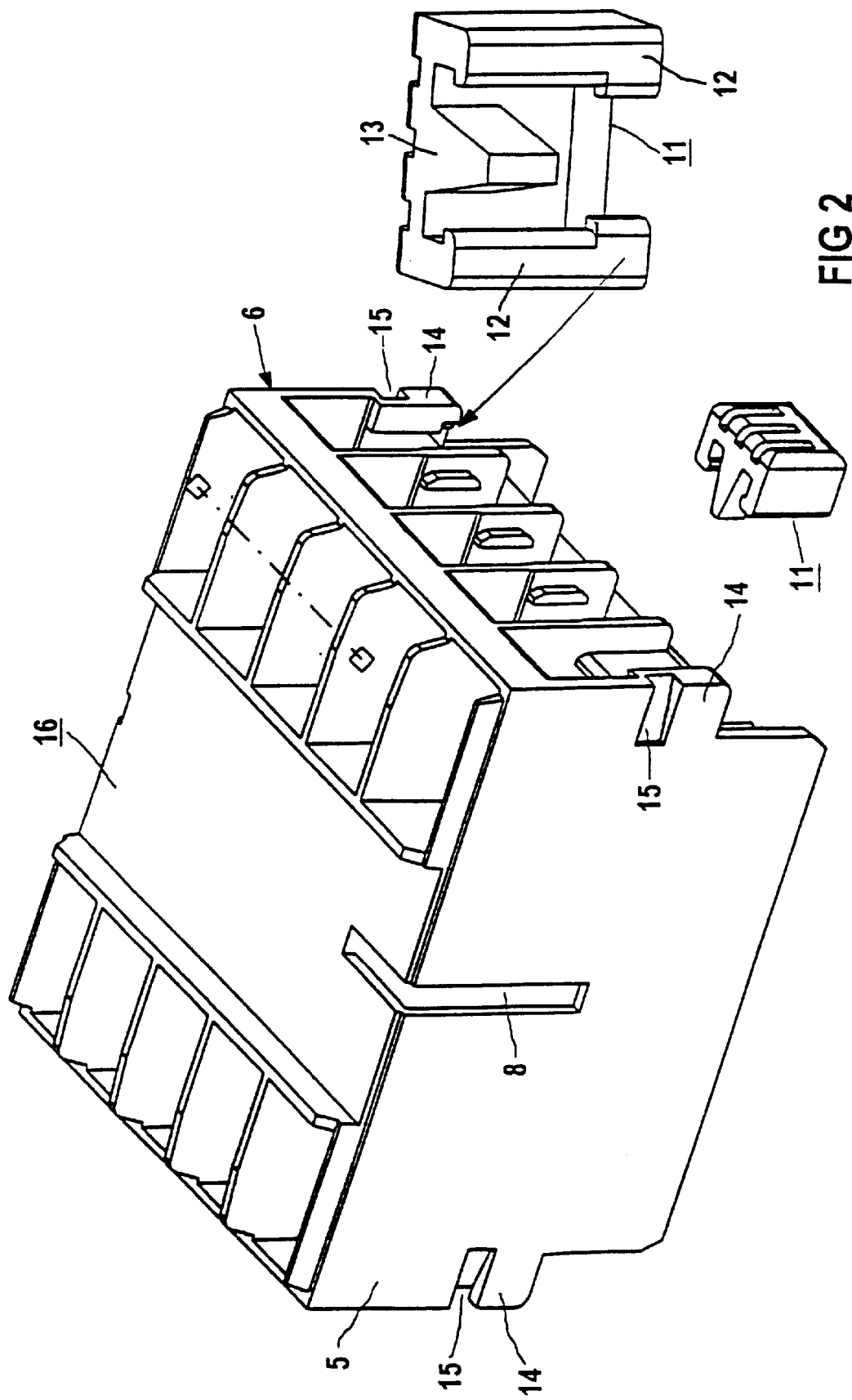
FIG. 2 shows a switching chamber of the switching devices according to FIG. 1, with an associated connecting element.

The two switching devices 1 and 2 are assembled to form a switchgear unit having a reversing combination by inserting the support 3 and the anchor 4 into the first slots 7 and the second slots 8 provided for this purpose in the connecting side walls 5 and 6, and by subsequently connecting the switching devices 1 and 2 by means of special connecting elements which in this case are designed as brackets 11. As shown in FIG. 2, the brackets 11 each have two limbs 12 and a center pin 13. Ribs 14, which in this case are part of the switching chamber 16 of the respective switching device 1 or 2, project from the top and bottom of the switching devices 1 and 2. When in each case one bracket 11 is pushed onto the top or bottom, the center pin 13 engages in a positively locking manner in a recess 15 formed by the ribs 14, and the two limbs 12 engage behind the ribs 14 from their outside. In the process, the limbs 12 latch behind the ribs 14. The regions which interact in this process are joined by a line. Assembly, and disassembly in the opposite sequence, of the switchgear unit can be carried out easily.

Figure 3:
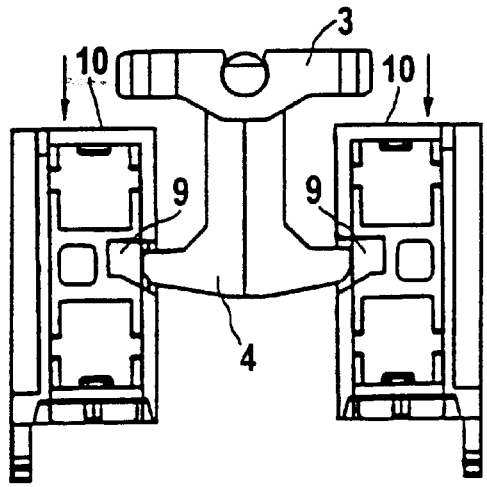
FIG. 3 shows an outline sketch with the contact carriers of the two switching devices according to FIG. 1 and the position of an anchor during a process in which the two switching devices are being switched on at the same time.
Figure 4:
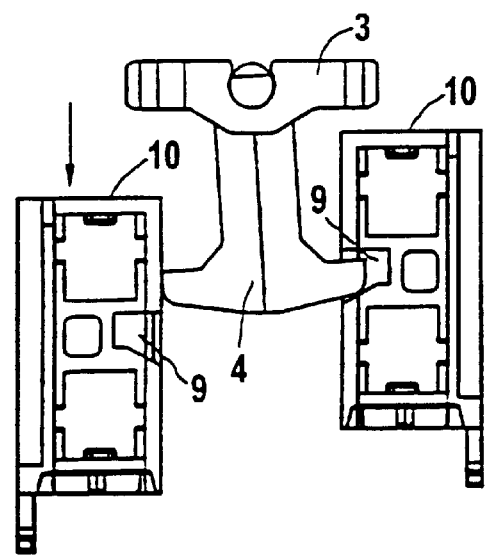
FIG. 4 shows the two contact carriers of the two switching devices when one of the switching devices is being switched on, and the other switching device is interlocked.

The principle of operation of the reversing combination can be illustrated by FIGS. 3 and 4. The contact carriers 10 are illustrated here, for example those of the two switching devices 1 and 2 mentioned above. The position of the anchor 4 governs the operation of the reversing combination. If both switching devices are switched on at the same time, the anchor 4 forms a lock. It engages in the cutouts 9 in the contact carriers 10, as shown in FIG. 3, and prevents switching on.

During the process of switching on only one of the switching devices 1 or 2, the anchor 4 is pressed into the cutout 9 in the other switching device 2 or 1, and interlocks this other switching device 2 as shown in FIG. 4. The reversing combination 3 and 4 accordingly ensures that the two switching devices 1 and 2 are never both in the switched-on state.

Figure 6:
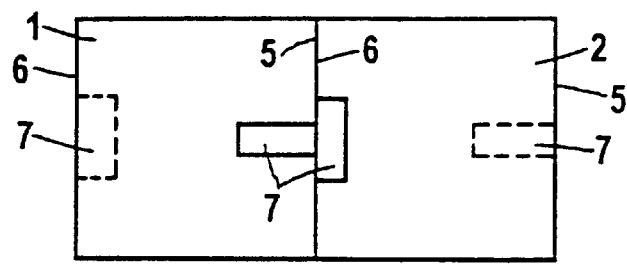
FIG. 6 shows the basic position and design of slots in the two switching devices according to FIG. 1 for accommodating a shape-coded support.

The two switching devices 1 and 2, which are preferably of the same design, each have a first slot 7 adjacent to one of its side walls 5, for accommodating the assembly comprising the anchor 4 and the support 3, as shown in see FIG. 5. In the installed state, only a small part of the assembly 3 and 4 projects out of the side wall 5, as illustrated in FIG. 1. On the other hand, the contact carrier 10 is closely adjacent to the opposite parallel side walls 6 in order that the anchor 4 enters its free space 9 after only a small pivoting movement. The design thus necessitates the reversing combination being produced with the connecting side wall 5 of the switching device 1 being connected to the connecting side wall 6 of the second switching device 2. In order to ensure this, the support 3 is shape-coded by being designed in the form of a hammer head, and the first slots 7 in the connecting side walls 5 and 6 are designed as a match, such that they are accommodated in a positively locking manner in the support 3, as is indicated in FIG. 6. The shape coding guarantees that the mechanical reversing combination is fitted in the correct orientation.

What is claimed:

1. A switchgear unit comprising:

a first switching device including a first contact carrier and a first connecting side wall;

a second switching device including a second contact carrier and a second connecting side wall;

a reversing combination being jointly provided to the first and second switching devices, the reversing combination including a support and an anchor, the anchor being pivotally mounted in the support;

the first switching device being connected via its first connecting side wall to the second connecting side wall of the second switching device;

the first and second connecting side walls including opposite first slots for receiving the support;

the first and second connecting side walls including opposite second slots for receiving the anchor;

wherein when the first and second switching devices are operated simultaneously, the anchor engages the first and second contact carriers and prevents both the first and second switching devices from being switched on; and wherein when one of the first and second switching devices is operated, the anchor is pressed into and interlocks the contact carrier of the other switching device.

2. The switchgear unit as recited in claim 1 further comprising connecting elements connecting the first and second switching devices, and wherein the first and second switching devices further include ribs, the connecting elements engaging the ribs in a bracket-like manner.

3. The switchgear unit as recited in claim 1 further comprising connecting elements connecting the first and second switching devices, the connecting elements including two outer limbs for engaging the first and second connecting side walls and a center pin, and wherein the first and second connecting walls form a recess, the center pin engaging the recess in a positive locking manner.

4. The switchgear unit as recited in claim 2 wherein the first and second connecting side walls form a recess, and wherein the connecting elements include two outer limbs for engaging the first and second connecting side walls and a center pin, the center pin engaging the recess in a positive locking manner.

5. The switchgear unit as recited in claim 1 wherein the support is shape-coded, the first slots being matched to the shape coding.

6. The switchgear unit as recited in claim 2 wherein the support is shape-coded, the first slots being matched to the shape coding.

7. The switchgear unit as recited in claim 3 wherein the support is shape-coded, the first slots being matched to the shape coding.

8. The switchgear unit as recited in claim 4 wherein the support is shape-coded, the first slots being matched to the shape coding.

* * * * *